United States Patent [19]
Currey et al.

[11] 3,826,450
[45] July 30, 1974

[54] LANDING GEAR FOR STOL AIRPLANES

[75] Inventors: Norman S. Currey, Atlanta; John H. Renshaw, Marietta, both of Ga.

[73] Assignee: Lockheed Aircraft Corporation, Burbank, Calif.

[22] Filed: June 4, 1973

[21] Appl. No.: 366,793

[52] U.S. Cl. .......................... 244/103 R, 280/150.5
[51] Int. Cl. .......................................... B64c 25/58
[58] Field of Search .......... 244/100, 102, 103, 104; 280/150.5, 43.23; 254/86 R, 86 H

[56] References Cited
UNITED STATES PATENTS
| | | | |
|---|---|---|---|
| 2,933,271 | 4/1960 | Maltby | 244/103 R |
| 3,327,974 | 6/1967 | Nicholl | 244/100 R |

FOREIGN PATENTS OR APPLICATIONS
| | | | |
|---|---|---|---|
| 1,086,855 | 2/1955 | France | 244/104 R |
| 411,875 | 6/1934 | Great Britain | 244/102 R |

Primary Examiner—Trygve M. Blix
Assistant Examiner—Paul E. Sauberer
Attorney, Agent, or Firm—Billy G. Corber; John J. Sullivan

[57] ABSTRACT

An airplane main landing gear is designed to provide abnormally high ground clearance at touchdown, for minimum ground effect and maximum nose-down angle, and then to slowly sink to normal ground clearance during the landing roll. This gear may be contracted to lower or "kneel" the airplane. In addition, differential lengthening of left and right gears is provided to permit the airplane to land in a banked attitude for crosswind landings, thereby obviating the necessity to fully straighten-out the airplane before touchdown during such operations. The latter feature also provides a crosswind gear which is operationally less complicated than conventional crosswind gears which necessitate turning/steering all gears or wheels.

6 Claims, 5 Drawing Figures

3,826,450

LANDING GEAR FOR STOL AIRPLANES

This invention relates to extensible type shock absorbing struts as employed on aircraft landing gear and more particularly to such a landing gear strut construction which is especially designed and adapted for use on STOL airplanes.

Extensible type landing gear struts have been heretofore employed on aircraft to raise and lower the aircraft with respect to the ground or supporting surface. In low wing airplanes, for example, it is often desirable to extend the landing gear struts so as to elevate the airplane and thereby increase the distance between the undersurface thereof and the runway to avoid ground suction. This also reduces engine ingestion of foreign matter from the runway or ground.

In other cases, lowering of kneeling of the aircraft is desired or required in order to facilitate on-and-off loading, for example. Also, on carriers such kneeling permits the compact parking of aircraft by tilting whereby to place the several airplanes in a nose-under-tail relationship one to the next.

So-called collapsible landing gear struts have been employed to minimize storage space required within the aircraft to nest them when retracted. After take off, these struts are made to collapse or telescope prior to their entry into the aircraft.

Variable length landing gear struts have also been proposed for aircraft to compensate for irregular and sloping terrain. Thus the gear on opposite sides of the space centerline have been made to extend and/or retract to maintain the main components, notably the fuselage, substantially level. This has especial utility in helicopters.

It has also been proposed to employ extensible type landing gears for vertical rising aircraft. By pitching the aircraft nose up, for example, by extending the length of the nost gear strut with or without lowering the main gear struts greater lift and/or drag is obtained to facilitate takeoff and landing.

In essence, many of these prior art extensible landing gears combine jacking with shock absorbers. In other words, the shock absorber which has become an integral part of the aircraft landing gear strut is modified to permit jacking to give it variable length.

In STOL airplanes new and different problems are imposed on the landing gear. Because of the increased angle of approach of the airplane when landing, the nose gear may be and usually is subjected to increased abuse due to first contact with the landing surface. This applies particularly to those cases where flare-out distance is reduced in order to minimize landing distance. Therefore, according to the present invention, it becomes desirable to extend the main landing gear struts prior to touchdown to thereby compensate for the extreme angle of attack of the airplane and absorb the initial landing impact. This permits a nose-down landing, while at the same time ensuring that the nose gear does not strike the ground prior to main gear contact.

Also STOL airplanes experience greater effects from crosswinds during landing than do conventional aircraft. To adjust for this, pilots customarily lower the airplane into the wind, i.e., lower one wing to maintain the airplane on source as much as possible. In such an attitude the landing gear on that side of the airplane is exposed to possible damage at touchdown if the pilot fails to level off at the last minute at or immediately prior to impact. This requires precise timing and skill on the part of the pilot which according to the teachings hereof is avoided by compensating for the airplane attitude by adjusting the landing gear strut length.

In addition to facilitating nose-down landings, and crosswind landings, the lengthening of the main gear, as herein proposed, increases ground height at touchdown. This maximizes wing-to-ground clearance, and thereby minimizes the deterioration of wing lift due to ground effect. By so doing, the pilot maintains better control of the airplane.

Essentially the present invention contemplates a shock absorbing strut of the conventional oleo pneumatic type modified to include a series connected actuator for the extension and retraction thereof. Such actuator incorporates an adjustable control to establish and maintain the effective length of the landing gear unit within the range of ths strut extension and retraction. Thus, among other things, fluid exchange inside the oleo strut as heretofore practiced is avoided altogether so that the shock absorbing strut per se remains an integral, unchanged unit. This has the advantage of reliability in the operation. At the same time, in the event of failure of the extensible mechanism, i.e., the actuator and its associated parts, the operation of the landing gear unit per se is not otherwise adversely affected.

With the above and other objects in view as will be apparent, this invention consists in the construction, combination and arrangement of parts all as hereinafter more fully described, claimed and illustrated in the accompanying drawings wherein:

FIG. 1 is a side elevation of a main landing gear unit of an airplane which is designed and constructed in accordance with the teachings of this invention with parts of the shock absorbing strut broken away to reveal the internal structure and arrangement thereof by which its extension and contraction is accomplished for touchdown, kneeling and crosswind compensation as well as the mechanism for raising and lowering the unit from the airplane, the associated airplane component or wing and the associated ground surface being shown in phantom lines;

Figure 1:
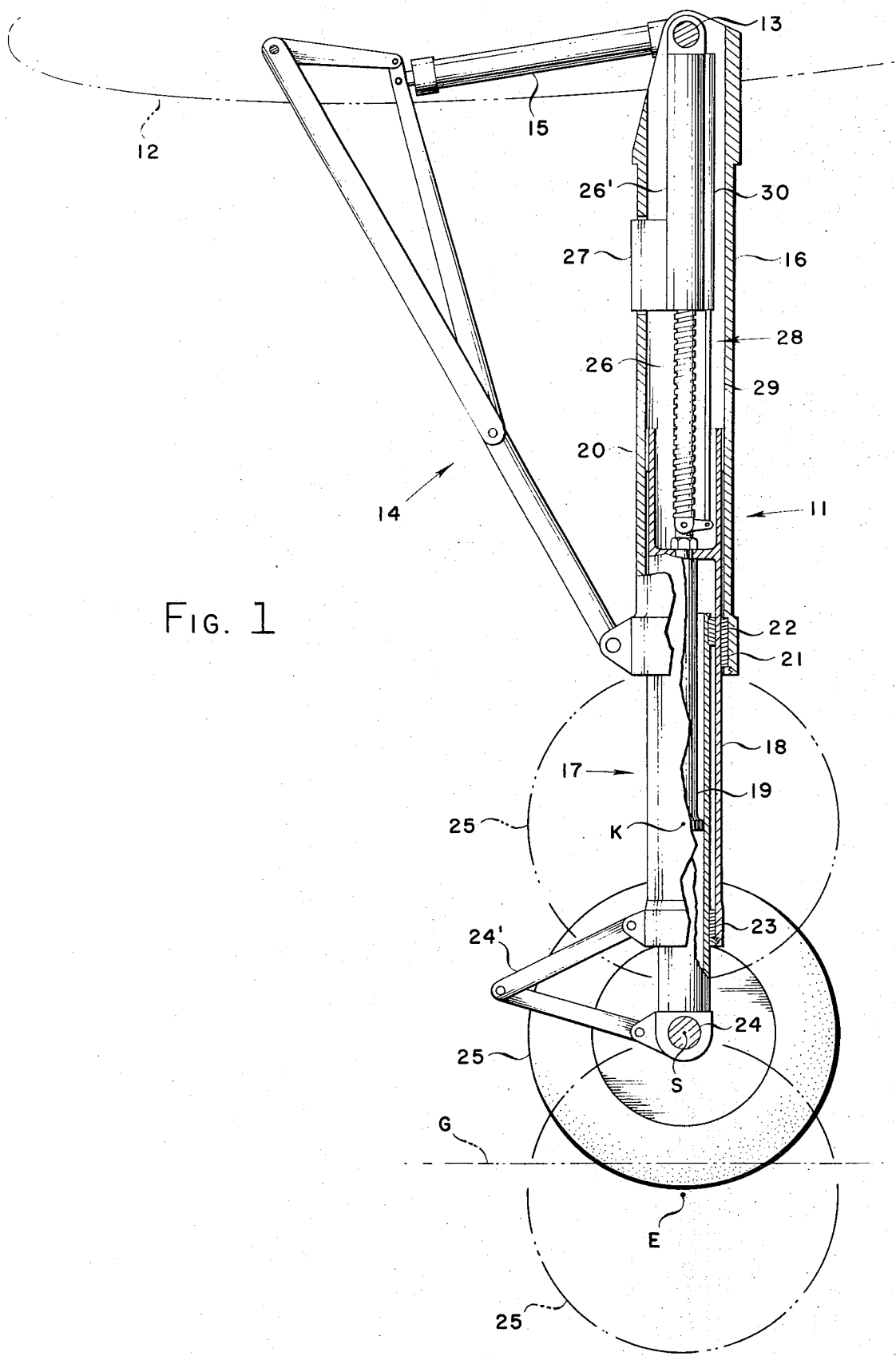

Referring more particularly now to the drawings, 10 designates a typical airplane having a tricycle landing gear arrangement wherein the main landing gear units 11 are mounted on each wing 12. Each landing gear unit 11 is retractable into the airplane 10 and to that end is pivotally connected through a fitting 13 to the interior wing structure. Linkage 14 appropriately connected between wing structure and each main landing gear unit 11 serves to control the path of movement of the unit 11 into and out of the airplane 10 in the usual manner by a suitable power drive such as, for example, an actuator 15.

Each fitting 13 is formed or otherwise carried by a support cylinder 16 in which a shock absorbing strut assembly 17 is mounted for reciprocation. Each shock absorbing strut 17 is made up of an outer cylinder 18 which is reciprocal in the support cylinder 16 and a piston or plunger 19 similarly mounted on the outer cylinder 18. A pair of bearing elements 20 and 21 carried by the shock strut outer cylinder 18 and the support cylinder 16 respectively serves to maintain the strut 17 in spaced relation with the support cylinder 16 and thereby facilitate its reciprocation. A similar pair of bearing elements 22 and 23 carried by the plunger 19 and the outer cylinder 18 similarly serves to facilitate the telescoping of the plunger 19 with its cylinder 18.

At its outer end the plunger 19 carries an axle 24 adapted to mount a surface contacting element here shown as a pair of landing gear wheels 25 and the cylinder 18 and piston 19 are interconnected one to the other by a pair of torsion links 24'. This is a conventional shock absorbing strut which is of the oleo pneumatic type whereby the wheels 25 through connection to the plunger 19 are adapted to reciprocate with respect to the cylinder 18 but are simultaneously secured against relative axial movement. At the same time the entire strut assembly 17 may reciprocate with respect to the support cylinder 16 as already mentioned.

According to the present invention, this shock strut assembly 17 is also mounted within the support cylinder 16 for powered reciprocation by means of and through the action of an actuator, preferably the screw jack 26. The screw jack 26 is connected to the upper end of the strut cylinder 18 and to the pivot fitting 13 within the wing 12. A motor 27 drives the screw jack 26 to extend and retract it in its housing 26' causing a corresponding reciprocation of the shock strut 17 in the support cylinder 16. This causes the corresponding extension and retraction of the landing gear wheels 25 to and from the extreme positions when kneeling K and when extended E, both indicated by a dot or broken line to show their position relative to the static position S (FIG. 1). The ground line G is illustrated by a broken line as a reference.

Within this range of extension, the length of each screw jack 26 is adjustable by means of and through a control mechanism 28. More specifically this control mechanism 28 comprises a follow-up rod 29 connected to the outer end of the screw 26 and extending into a housing 30 mounted on one side of the screw housing 26'. Internally, the housing 30 contains coacting sensing units 31 constituting a potentiometer connected through leads 32 to associated equipment (not shown) which is energized thereby to secure the length of the follow-up rod 29 in a preselected position.

Operationally, the pilot selects differential main landing gear lengths to enable both left and right gears 11 to touch the ground when the airplane 10 is rolled to the number of degrees required to counteract crosswind forces. These differential lengths are provided by extending one screw 26 to its maximum stroke and then extending the other screw 26 to whatever length is required to provide the required differentiation. Each screw 26 is held in that position by its irreversible features.

Figure 4:
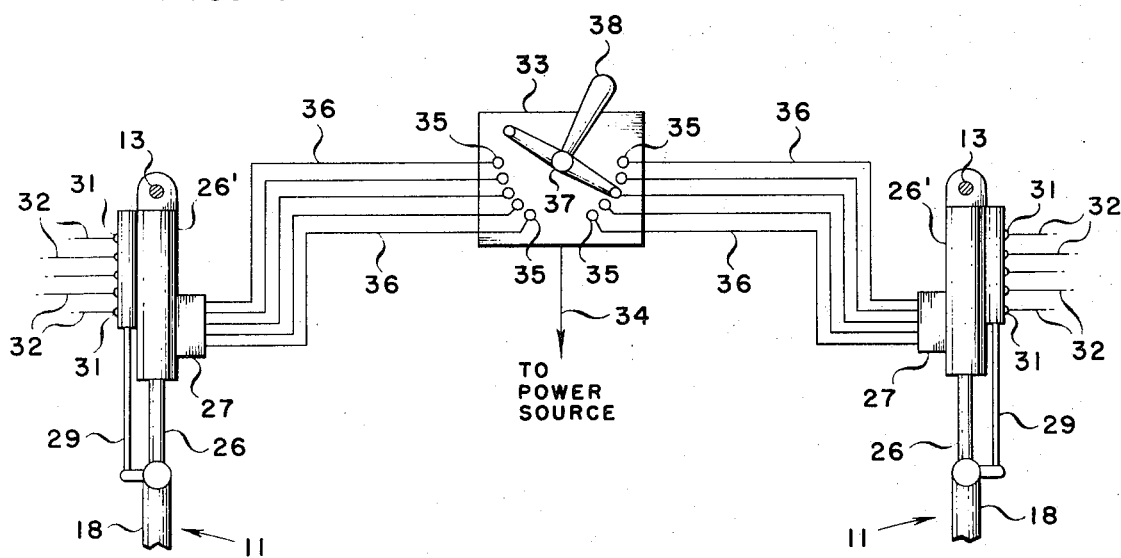
FIG. 4 is a schematic illustrative of the control system for the operation of each main landing gear unit.

As shown in FIG. 4 a pilot operated control box 33 located within the cockpit or cabin of the aircraft 10 is electrically powered by a suitable source (not shown) connected thereto through a conductor 34. The conductor 34 terminates within the box 33 in a plurality of discrete contacts 35 each individually, electrically connected through a conductor 36 to the motor 27 of each main landing gear unit 11. The several contacts 35 to each unit 11 are symmetrically arranged about the axis 37 of a pilot's control handle 38 with respect to the contacts 35 of the other unit 11.

Figure 5:
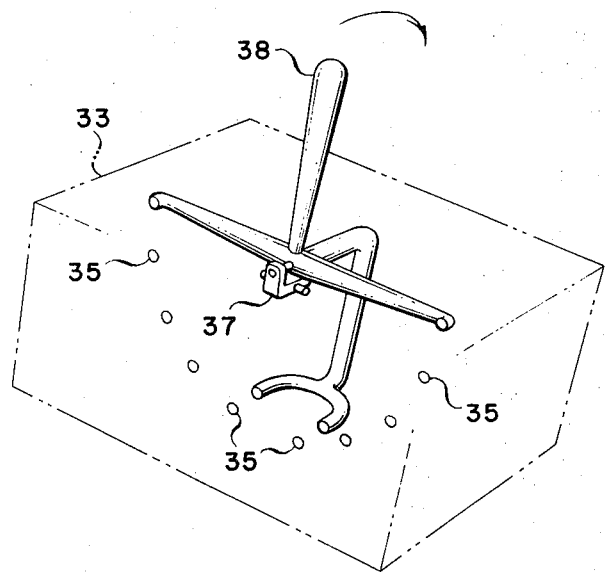
FIG. 5 is a detail of the pilot's control lever shown in FIG. 4.

More specifically, the contacts 35 are so arranged that when the handle 38 is in the vertical position (FIG. 5) it establishes a circuit between the power source through conductor 34, the uppermost contacts 35, conductors 36 and the motors 26 of both landing gear units 11. The screwjacks 26 of both units 11 are thereby fully extended simultaneously, i.e., the axles 24 are disposed in position E.

Rotation of the handle 38 to either side of this vertical successively energizes the motor 27 of the corresponding landing gear unit 11 whereby the unit 11 alone is contracted. The terminals of the several conductors 36 within each motor 27 are appropriately connected to the several sensing units 31 of the control 28 so that such operation of each motor 27 contracts its screwjack 26 and the associated landing gear unit 11 accordingly. The length of each landing gear unit 11 is thereby selectively established to permit wheels level landing while the airplane attitute is such as to counteract crosswind forces during landing.

The handle 38 is also mounted for movement in an aft direction, i.e., movement at right angles to the rotary movement just described, the axis 37 being mounted in a socket, constituting a universal joint. When the handle 38 is so moved it disengages the uppermost contacts 35 breaking the circuit between the power source and motors 27 for full extension of the screwjacks 26, as described. When the handle reaches its extreme aft position it engages the lowermost contacts 35 thereby energizing both landing gear units 11 causing the full contraction of the associated screwjacks 26 in unison. This corresponds to the kneeled position K of the landing gear axles 24.

Figure 2:
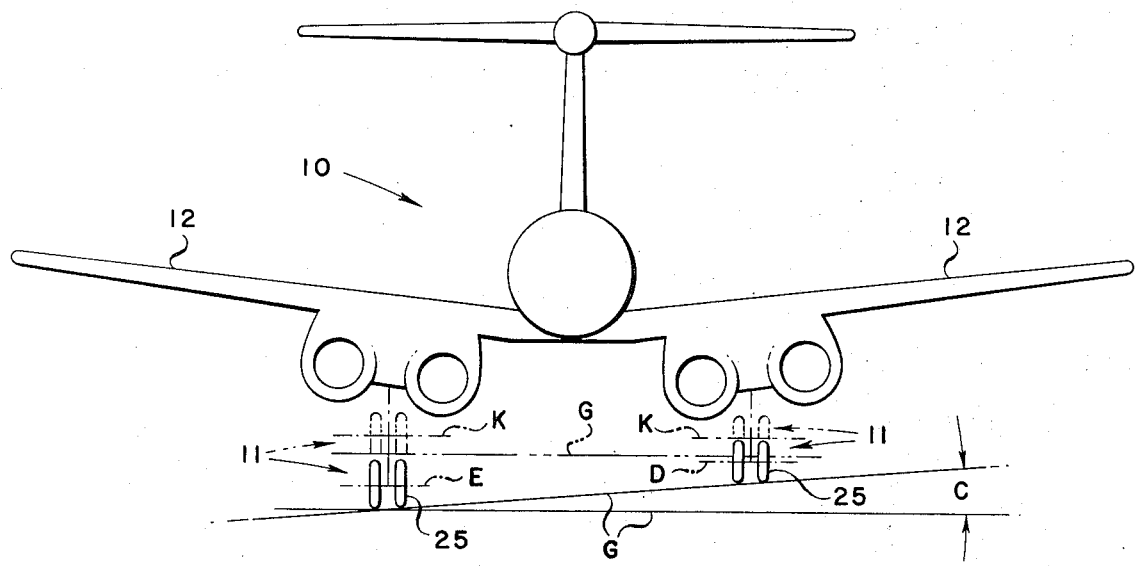
FIG. 2 is a front elevation of a typical airplane equipped with main landing gear units as illustrated in FIG. 1, the ground contacting elements or wheels of each main landing gear unit being illustrated in phantom lines corresponding to the three essential, alternate positions of adjustment corresponding to kneeling, touchdown and crosswind compensation.

Referring more particularly to FIG. 2 of the drawings, alternate positions of each axle of the main landing gear wheels 25 are shown. These are the kneeled K, i.e., when the screwjacks 26 are fully contracted, and a crosswind compensation position where one landing gear unit 25 is fully extended E while the other is disposed in a selected intermediate or differential position D by operation of their respective screwjacks 26. The corresponding location of the ground line G is referenced to these two landing gear positions with C designating the angle established by the main landing gear wheels 25 in the crosswind mode at touchdown.

Figure 3:
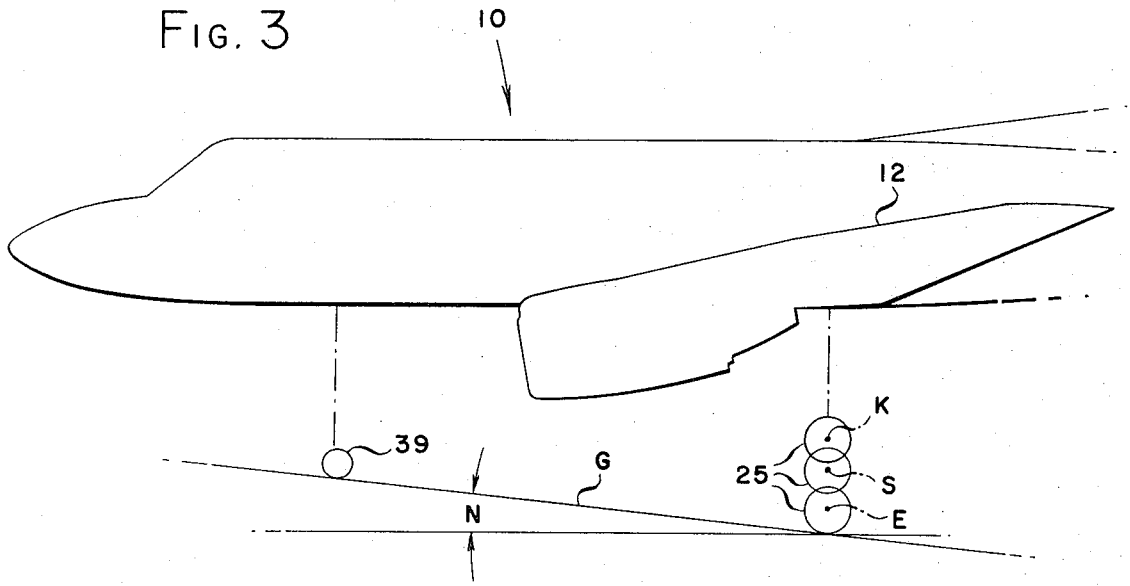
FIG. 3 is a side elevation of a typical aircraft to show the relative position of each main landing gear unit corresponding to the three alternate positions of kneeling, fully extended and normal ground line.

In FIG. 3 the three alternate positions of the main landing gear wheels 25 are illustrated as they relate to the position of the nose gear wheel 39 at touchdown. As clearly shown when the main landing gear units 11 are fully extended, i.e., wheel axle 24 assumes position E, this has the effect of giving the aircraft 10 a nose down attitude established by the angle N between the main gears and nose gear at touchdown. Thus, the main landing gear wheels 25 are made to touch down prior to or at the same time as the nose landing gear wheel 39. The main landing gear units 11, therefore, bear the major impact load of the aircraft 10 in landing.

What is claimed is:

1. A landing gear unit for STOL aircraft comprising;
   a shock absorbing strut,
   a surface contacting element mounted on the outer end of said strut,
   a housing adapted to receive and engage the inner end of said strut in one end thereof, said housing being secured at its other end to structure of the aircraft, and
   an actuator disposed within said housing and connected at opposite ends to the other housing end aforesaid and to said inner strut end and operative to move said strut into and out of said housing whereby the surface contacting element aforesaid is located at a distance from said aircraft.

2. The landing gear unit of claim 1 wherein said housing is cylindrical and said strut is mounted for sliding coaction therewith.

3. The landing gear unit of claim 2 wherein said actuator is a screwjack.

4. The landing gear unit of claim 2 including a control mechanism associated with said actuator to adjust the length thereof and thereby locate said surface contacting element in a selected one of several distances from said aircraft.

5. The landing gear unit of claim 4 wherein said control mechanism includes a second housing substantially coextensive with said strut housing, and a rod connected at one end to the outer end of said actuator and in slidable engagement within said second housing, a plurality of sensing units within said second housing responsive to movement of said rod, and a connection between each of said sensing units and said actuator to limit the operation thereof.

6. The landing gear unit of claim 5 including a motor operatively connected to said actuator, a number of drive connections for said motor, one corresponding to each of said sensing units, and a connection operative between each said drive connection and one sensing unit.

* * * * *